*(12)* United States Patent
Shiraishi

(10) Patent No.: US 8,913,475 B2
(45) Date of Patent: Dec. 16, 2014

(54) DATA DETECTING DEVICE, REPRODUCING DEVICE, AND DATA DETECTING METHOD

(75) Inventor: Junya Shiraishi, Nagano (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/236,954

(22) Filed: Sep. 20, 2011

(65) Prior Publication Data

US 2012/0082201 A1 Apr. 5, 2012

(30) Foreign Application Priority Data

Oct. 4, 2010 (JP) ................................ P2010-224930

(51) Int. Cl.
*G11B 7/004* (2006.01)
*G11B 20/10* (2006.01)
*G11B 20/12* (2006.01)

(52) U.S. Cl.
CPC .... *G11B 20/10009* (2013.01); *G11B 20/10046* (2013.01); *G11B 20/10055* (2013.01); *G11B 20/10222* (2013.01); *G11B 20/10277* (2013.01); *G11B 20/1037* (2013.01); *G11B 20/10481* (2013.01); *G11B 20/10509* (2013.01); *G11B 2020/10759* (2013.01); *G11B 2020/1268* (2013.01); *G11B 2220/2541* (2013.01); *G11B 2220/2545* (2013.01); *G11B 2220/2562* (2013.01)
USPC .................. 369/124.01; 369/53.2; 369/53.35; 375/232

(58) Field of Classification Search
USPC .................... 375/232; 369/53.11, 53.12, 53.2, 369/124.01, 53.35
See application file for complete search history.

(56) References Cited

U.S. PATENT DOCUMENTS

| 5,602,813 | A | | 2/1997 | Furumiya | |
|---|---|---|---|---|---|
| 5,696,756 | A | * | 12/1997 | Fujimoto et al. | ........... 369/275.4 |
| 5,835,469 | A | | 11/1998 | Maeda et al. | |
| 6,584,049 | B1 | * | 6/2003 | Ma et al. | ................... 369/44.41 |
| 6,678,230 | B2 | * | 1/2004 | Miyashita et al. | ......... 369/53.16 |
| 6,804,187 | B2 | | 10/2004 | Miyanabe et al. | |
| 7,095,696 | B2 | * | 8/2006 | Nakajima et al. | .......... 369/59.12 |
| 7,194,674 | B2 | * | 3/2007 | Okumura et al. | ............. 714/795 |

(Continued)

FOREIGN PATENT DOCUMENTS

| EP | 1178484 A2 | 2/2002 |
|---|---|---|
| EP | 2051256 A1 | 4/2009 |
| JP | 3225611 B2 | 2/1994 |
| JP | 2601174 B2 | 7/1995 |
| JP | 4184585 B2 | 3/2002 |

(Continued)

OTHER PUBLICATIONS

European Search Report EP 11178849, dated Nov. 18, 2011.

(Continued)

*Primary Examiner* — Thomas Alunkal
(74) *Attorney, Agent, or Firm* — Sony Corporation

(57) ABSTRACT

A data detecting device includes a multi-input adaptive equalizer, a binarizing unit, and an equalization error calculating unit. The multi-input adaptive equalizer includes a plurality of adaptive equalizers and outputs a reproduction information signal from a target track and a reproduction information signal from a close track close to the target track as equalization signals by calculating outputs of the adaptive equalizers, the reproduction information signals being input to the adaptive equalizers, respectively as reproduction information signals. The binarizing unit obtains binarized data by performing a binarization process on the equalization signals. The equalization error calculating unit obtains an equalization error from an equalization target signal obtained from the binarization result of the binarizing unit and an equalization signal output from the multi-input adaptive equalizer, and supplies the equalization error as a tap coefficient control signal for equalization to the adaptive equalizers.

11 Claims, 8 Drawing Sheets

(56) References Cited

U.S. PATENT DOCUMENTS

| | | | |
|---|---|---|---|
| 7,349,321 B2 * | 3/2008 | Kudo et al. | 369/124.03 |
| 7,366,234 B2 * | 4/2008 | Yamamoto et al. | 375/232 |
| 7,869,327 B2 * | 1/2011 | Miyashita et al. | 369/53.35 |
| 8,031,091 B2 * | 10/2011 | Kibune | 341/118 |
| 2001/0043651 A1 * | 11/2001 | Nishimura et al. | 375/232 |
| 2005/0259551 A1 * | 11/2005 | Kudo et al. | 369/59.22 |
| 2006/0077798 A1 * | 4/2006 | Kuroda et al. | 369/44.25 |
| 2007/0025224 A1 | 2/2007 | Tatsuzawa et al. | |

FOREIGN PATENT DOCUMENTS

JP   2008-108325 A   5/2008

OTHER PUBLICATIONS

Cioffi J M et al: "Adaptive Equalization in Magnetic-Disk Storage Channels", IEEE Communications Magazine, IEEE Service Center, Piscataway, US, vol. 28, No. 2, Feb. 1, 1990, pp. 14-29, XP 000102048.

* cited by examiner

FIG. 5
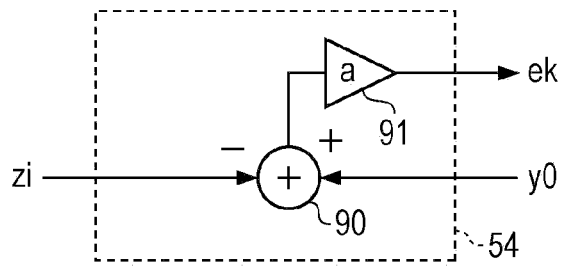
FIG. 6A
| | RADIAL (RADIAL DIRECTION) TILT ANGLE [deg.] | | |
|---|---|---|---|
| | -0.6 | 0 | +0.6 |
| COMPARATIVE EXAMPLE | 2.63E-04 | 4.51E-06 | 9.54E-04 |
| EMBODIMENT | 6.25E-06 | 3.13E-06 | 3.13E-06 |
| RATIO (%) | 2.4 % | 69.2 % | 0.3 % |
FIG. 6B
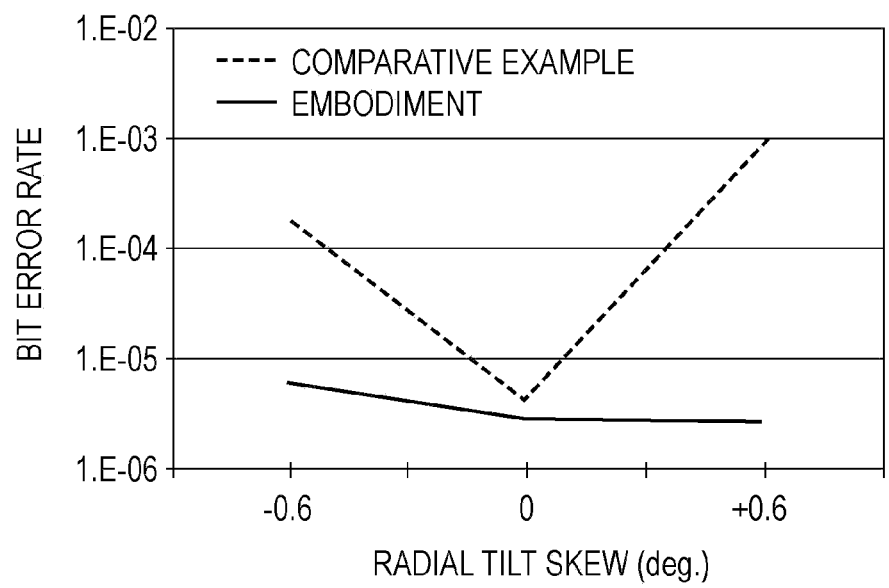

US 8,913,475 B2

DATA DETECTING DEVICE, REPRODUCING DEVICE, AND DATA DETECTING METHOD

CROSS-REFERENCE TO RELATED APPLICATION

The present application claims priority from Japanese Patent Application No. JP 2010-224930 filed in the Japanese Patent. Office on Oct. 4, 2010, the entire content of which is incorporated herein by reference.

BACKGROUND

The present disclosure relates to a data detecting device, a reproducing device, and a data detecting method, particularly, a technology of canceling crosstalk from an adjacent track.

There is a problem of deterioration of a reproduction signal due to crosstalk from an adjacent separate track in a reproducing device for a recording medium, such as an optical disc, such that there is a crosstalk canceller technology for removing the problem.

For example, Japanese Patent No. 3225611 discloses a technology of reducing crosstalk between tracks by adding appropriate coefficients on reproduction signals (that is, reproduction signals of a reproduction track and the adjacent track) of three tracks synchronized in the radial direction of a disc, using a memory or a delay element, in a CAV (Constant-Angular-Velocity) disc.

Further, Japanese Patent No. 2601174 or Japanese Patent No. 4184585 discloses a technology of automatically synchronizing phase differences among the reproduction signals of three tracks obtained from an optical head with three beams, with high accuracy that is sufficient for crosstalk calculation.

Further, Japanese Unexamined Patent Application Publication No. 2008-108325 discloses a technology of canceling the crosstalk of a main reproduction signal by synchronizing a memory, which stores reproduction signals of two or more tracks, with a correlation calculator or a phase interpolator (a phase regulator), and calculating crosstalk signal replica through an appropriate filter.

SUMMARY

In general, the followings (1) and (2) is necessary for canceling crosstalk with high accuracy.

(1) Synchronizing a reproduction signal of an adjacent (or close) track with the accuracy of a channel clock (2) Reproducing the frequency characteristic of crosstalk from an adjacent (or close) track to the main reproduction track (that is, generation of a crosstalk signal)

The technologies of all of Japanese Patent No. 3225611, Japanese Patent No. 2601174, Japanese Patent No. 4184585, and Japanese Unexamined Patent Application Publication No. 2008-108325 aim to effectively cancel crosstalk, but Japanese Patent No. 3225611 is limited in performance to the CAV disc.

Further, Japanese Patent No. 2601174 and Japanese Patent No. 4184585 are limited in performing to a device equipped with a reproduction pickup with three beams.

Further, since (2) is not considered in Japanese Patent No. 3225611, Japanese Patent No. 2601174, and Japanese Patent No. 4184585, sufficient effect may not be obtained.

Meanwhile, the technology of Japanese Unexamined Patent Application Publication No. 2008-108325 considers the concerns of (1) and (2), but it is necessary to dispose a phase difference detecting circuit and a phase synchronizing circuit, which have high accuracy at 1 clock or less, before a crosstalk canceller, such that mounting is complicated.

It is desirable to make it possible to detect reproduction data by performing accurate crosstalk cancellation even against variation of a dynamic crosstalk component, with a simple and easy configuration.

A data detecting device according to an embodiment of the present disclosure includes: a multi-input adaptive equalizer that includes a plurality of adaptive equalizers and outputs a reproduction information signal from a target track, which is data detection target, and a reproduction information signal from a close track close to the target track, which is a crosstalk component for the reproduction information signal, as equalization signals by calculating outputs of the adaptive equalizers, in which the reproduction information signals are input to the adaptive equalizers, respectively as reproduction information signals read out from a recording medium; a binarizing unit that obtains binarized data by performing a binarization process on the equalization signals of the multi-input adaptive equalizer; and an equalization error calculating unit that obtains an equalization error from an equalization target signal obtained from the binarization result of the binarizing unit and an equalization signal output from the multi-input adaptive equalizer, and supplies the equalization error as a tap coefficient control signal for equalization to the adaptive equalizers.

Further, the data detecting device further includes a memory unit that stores the reproduction information signals read out from the recording medium, in which the reproduction information signal from the target track and the reproduction information signal from the close track are read out from the memory unit at each time point and supplied to the plurality of adaptive equalizers.

Further, the data detecting device further includes a phase difference detecting unit that detects a phase difference between the reproduction information signals read out from the memory unit and input to the plurality of adaptive equalizers, and outputs a correction signal for correcting the reading timing of the reproduction information signals from the memory unit on the basis of the detected phase difference.

Further, the multi-input adaptive equalizer includes three adaptive equalizers, and the reproduction information signal from the target track, the reproduction information signal from the close track adjacent to one side of the target track, and the reproduction information signal from the close track adjacent to the other side of the target track are input to the three adaptive equalizers, respectively.

Further, the multi-input adaptive equalizer performs a partial response equalization process on the reproduction information signal from the target track, the binarizing unit performs a maximum-likelihood decoding process as a process for the binarization process on the equalization signal of the multi-input adaptive equalizer, and the equalization error calculating unit obtains an equalization error through a calculation using an equalization target signal obtained a convolution process of the binary detection result by the maximum-likelihood decoding and the equalization signal output from the multi-input adaptive equalizer.

A reproducing device according to an embodiment of the present disclosure includes a head unit that reads out information from a recording medium, the multi-input adaptive equalizer of the data detecting device according to the above embodiment, a binarizing unit, an equalization error calculating unit, and a demodulating unit that demodulates reproduction data from binary data obtained by the binarizing unit.

A data detecting method according to an embodiment of the present disclosure includes: inputting a reproduction information signal from a target track, which is data detection target, and a reproduction information signal from a close track close to the target track, which is a crosstalk component for the reproduction information signal, to a plurality of adaptive equalizers, respectively, as reproduction information signals read out from a recording medium; outputting equalization signals by calculating outputs of the adaptive equalizers; obtaining binary data by performing a binarization process on the equalization signals; and performing tap coefficient control for adaptive equalization of the adaptive equalizers, using an equalization error between an equalization target signal obtained on the basis of the binary detection result in the binarizing process and the equalization signal.

According to an embodiment, the optimum reproduction signal is obtained and reproduction performance is improved by reducing crosstalk components from adjacent tracks in reproducing, using the multi-input adaptive equalizer.

The multi-input adaptive equalizer performs crosstalk cancellation, using a characteristic optimizing function for both the phase and the amplitude of the adaptive equalizers.

That is, the adaptive equalizer where the reproduction information signal from the target track is input performs optimizing of an input signal frequency component error and phase distortion of the reproduction information signal. The tap coefficient control for optimizing is performed by using an equalization effort of an equalization target signal and an equalization signal.

Meanwhile, in the adaptive equalizer where the reproduction information signal from a close track is input, the equalization target signal is not connected with the close track signal input to the adaptive equalizer. Therefore, it is possible to obtain a signal for canceling the crosstalk components as the output when the adaptive equalizer performs the tap coefficient control, using the equalization error. Accordingly, it is possible to obtain an equalization signal with the crosstalk components canceled, by calculating the outputs of the adaptive equalizers.

Therefore, it is possible to cancel the following and corresponding crosstalk components even for dynamic crosstalk components while detecting a phase error or reducing phase adjustment that is necessary in the related art.

According to the embodiments, since it is possible to remove the crosstalk components of a close track from a reproduction information signal with very high accuracy, with a relatively simple and easy configuration, it is possible to improve reproduction data detection ability. In particular, the reproduction performance can be considerably improved in high-accuracy recording or recording of an interposed track pitch, in which deterioration due to crosstalk from a close track easily becomes serious.

BRIEF DESCRIPTION OF THE DRAWINGS

FIG. 5 is a block diagram of an equalization error calculator according to an embodiment.

FIGS. 6A and 6B are illustrative diagrams of a result by crosstalk cancellation according to an embodiment.

DETAILED DESCRIPTION OF EMBODIMENTS

Figure 1:
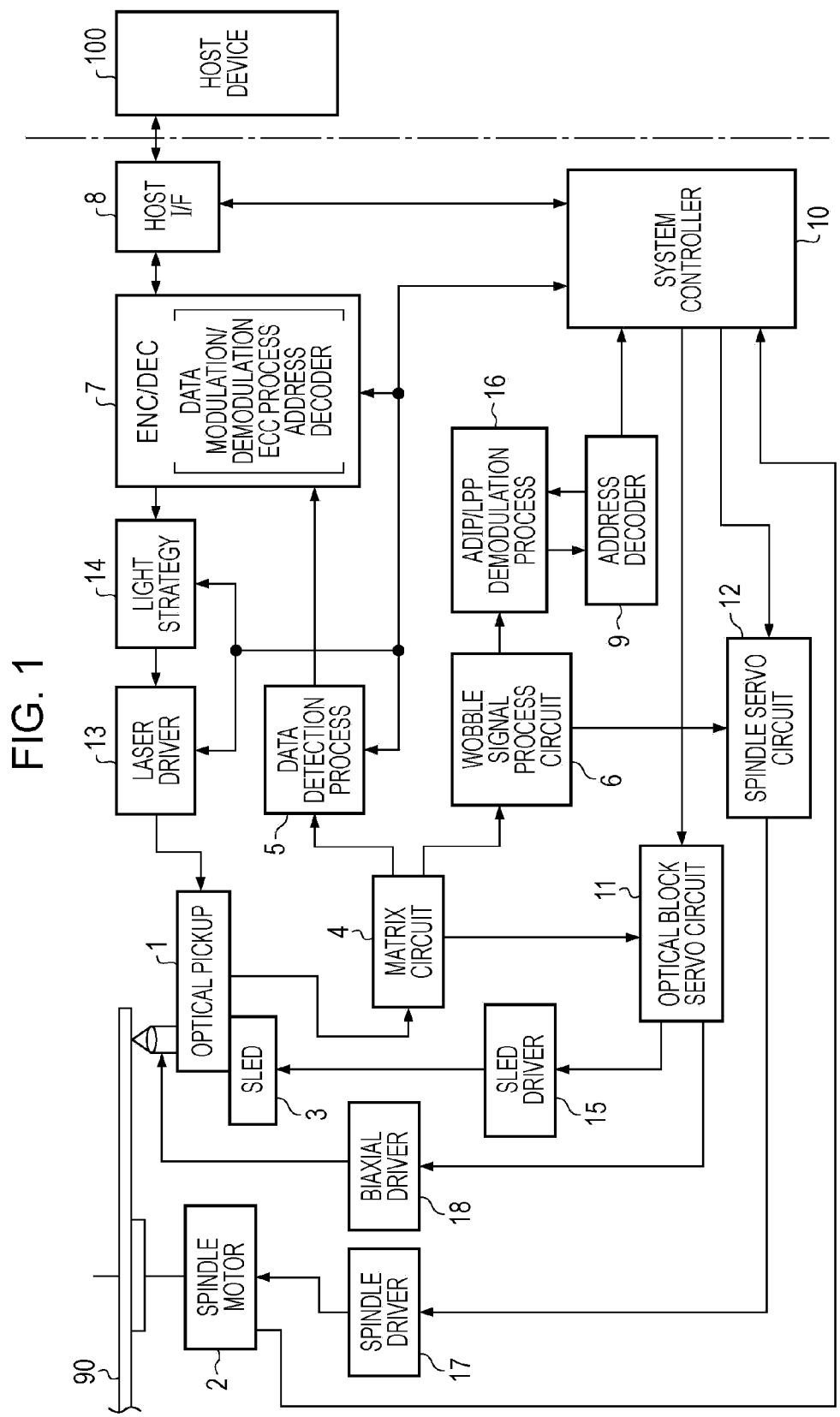
FIG. 1 is a block diagram of a disk drive device according to an embodiment of the present disclosure.

Hereinafter, embodiments of the present disclosure are described. A disk drive device that performs record reproduction on an optical disc is exemplified as a reproducing device of the present disclosure and a data detection processing unit disposed in the disk drive device is exemplified as a data detecting device in the embodiments. The first to third embodiments are different in the configuration of data detection processing units.

The description is given in the following order.
<1. Configuration of Disk Drive Device
<2. Data Detection Processing Unit of First Embodiment
<3. Data Detection Processing Unit of Second Embodiment
<4. Data Detection Processing Unit of Third Embodiment
<5. Modified Example 1. Configuration of Disk Drive Device The configuration of a disk drive device according to the embodiment is described by FIG. 1.

It is assumed that a disk drive device according to the embodiment can perform reproducing or recording on a CD (Compact Disc), a DVD (Digital Versatile Disc), Blu-ray Disc (registered trademark), or a reproduce-only disc or recordable disc (write once disc or rewritable disc) as a next generation disc.

For example, for the Blu-ray disc that is a recordable disc, record reproduction of a phase change mark or a pigment change mark under a condition of combination of a laser (a so-called a blue laser) having a wavelength of 405 nm and an objective lens having an NA of 0.85, and record reproduction is performed on a data block having a track pitch of 0.34 μm, a line density of 0.12 μm/bit, at 64 KB, as one record reproduction unit (RUB: Recording Unit Block).

Further, reproduction-only data is recorded on a record-only disc by an embossed pit that is about λ/4 deep. As described above, the track pitch is 0.32 μm and the line density is 0.12 μm/bit. Further, a data block of 64 KB is considered as one reproduction unit (RUB).

The RUB, which is the record reproduction unit, is total 498 frames created by adding a link area of one frame to an ECC block (cluster) of 156 symbols×496 frames, for example, to the front or the rear.

Further, in the recordable disc, grooves are formed in serpentine shapes (wobbling) on the disc and the wobbling grooves are record reproduction tracks. Further, the groove wobbling includes so-called ADIP (Address In Pregroove) data. That is, it is possible to obtain an address on the disc by detecting the information on wobbling of a groove.

In the recordable disc, a recording mark using a phase change mark is recorded on the track formed by a wobbling groove, the phase change mark is recorded with a line density of 0.12 μm/bit and 0.08 μm/bit by an RLL (1,7) PP modulation method (RLL: Run Length Limited, PP: Parity preserved/Prohibit rmtr (repeated Minimum transition run-length)) or the like.

When a channel clock cycle is 'T', the unit length of the mark is 2T to 8T.

In the reproduction-only disc, although a groove is not formed, data modulated by the RLL (1,7) PP modulation method is recorded as a series of embossed pits.

When the Blu-ray disc or an optical disc 90, such as a DVD, is loaded on a disk drive device, it is mounted on a turn table (not shown) and turned at a constant linear velocity (CLV) or a constant angular velocity (CAV) by a spindle motor 2 in a recording/reproducing operation.

Further, the mark information recorded in the tracks on the optical disc 90 is read out by an optical pickup (optical head) 1 in reproducing.

Further, when data is recorded on the optical disc 90, user data is recorded in a track on the optical disc 90, as a phase change mark or a pigment change mark, by the optical pickup 1.

Further, although, for example, physical information on the disc is recorded by the embossed pit or the wobbling groove, as reproduction-only management information, around the inner circumferential area 91 of the optical disc 90, the information is also read out by the optical pickup 1.

Further, in the optical disc 90, the ADIP information embedded as the wobbling of the groove track on the disc 90 is read out by the optical pickup 1.

A laser diode that is a laser source or a photodetector that detects reflected light, an objective lens that is the output end of laser light, and an optical system that radiates laser light onto a disc record surface through the objective lens and leads the reflected light to the photodetector are formed in the optical pickup 1.

The objective lens is held to be movable in a tracking direction and a focusing direction by a bi-axial mechanism in the pickup 1.

Further, the entire optical pickup 1 can be moved in the radial direction of the disk by a sled mechanism 3.

Further, the laser diode of the optical pickup 1 is driven to emit laser by flow of driving current by a laser driver 13.

Reflective light information from the disc 90 is detected by the photodetector and supplied to a matrix circuit 4 as an electric signal according to the amount of received light.

The matrix circuit 4 is equipped with a current/voltage conversion circuit and a matrix calculating/amplifying circuit, corresponding to output current from a plurality of light receiving elements, which is the photodetector, and generates a signal for a matrix calculation process.

The matrix circuit 4 generates, for example, a reproduction information signal (RF signal) corresponding to reproduction data, a focus error signal for servo control, and a tracking error signal.

Further, the matrix circuit 4 generates, a push-pull signal as a signal relating to the wobbling of a groove, that is, a signal for detecting the wobbling.

The reproduction information signal output from the matrix circuit 4 is supplied to a data detection processing unit 5, the focus error signal and the tracking error signal are supplied to an optical block servo circuit 11, and the push-pull signal is supplied to a wobble signal processing circuit 15.

The data detection processing unit 5 performs a binarizing process on the reproduction information signal.

For example, the data detection processing unit 5 obtains a binarized data series by a partial response maximum-likelihood decoding process (PRML detection method: Partial Response Maximum Likelihood detection method), by performing an A/D conversion process of an RF signal, a reproduction clock generation process, a PR (Partial Response) equalization process by PLL, and a Viterbi decoding (likelihood decoding). The detailed description is provided later.

Further, the data detection processing unit 5 supplies the binarized data series, as the information read out from the optical disc 90, to an encoding/decoding unit 7 at the latter stages.

The encoding/decoding unit 7 demodulates the reproduction data in reproducing and modulates the record data in recording. That is, the encoding/decoding unit 7 performs data demodulation, de-interleave, ECC decoding, and address decoding in reproducing, and performs ECC encoding, interleave, and data modulation in recording.

The binarized data series decoded by the data detection processing unit 5 is supplied to the encoding/decoding unit 7 in reproducing. The encoding/decoding unit 7 obtains reproduction data from the optical disc 90 by performing a demodulating process on the binarized data series. That is, for example, the encoding/decoding unit 7 obtains reproduction data from the optical disc 90 by performing a demodulating process for data recorded on the optical disc 90 by applying run length limited code modulation, such s RLL (1,7) PP modulation, and an ECC decoding process that performs error correction.

The data decoded up to the reproduction data from the encoding/decoding unit 7 is transmitted to a host interface 8 and transmitted to a host device 200 on the basis of an instruction from a system controller 10. The host device 200 is, for example, a computer device or an AV (Audio-Visual) system device.

Processing of the ADIP information is performed in recording/reproducing on the optical disc 90.

That is, the push-pull signal output as a signal relating to the wobbling of a groove from the matrix circuit 4 is a wobble data digitalized by the wobble signal processing circuit 6. Further, a clock synchronized to the push-pull signal by the PLL process is generated.

The wobble data is demodulated into a data stream of the ADIP address by an ADIP demodulating circuit 16 and supplied to the address decoder 9.

The address decoder 9 obtains an address by decoding the supplied data and supplies the address to a system controller 10.

In recording, although record data is transmitted from the host device 200, the record data is supplied to the encoding/decoding unit 7 through a host interface 8.

In this case, the encoding/decoding unit 7 performs addition of error collection code (ECC encoding), interleave, or addition of a subcode, as an encoding process of the record data. Further, run length limited code modulating, such as RLL (1-7) PP method, is applied to the data that has undergone the process.

The record data processed by encoding/decoding unit 7 is supplied to a light strategy unit 14. The light strategy unit adjusts the characteristics of the recording layer, the spot shape of the laser light, and the waveform of a laser driving pulse for a record linear velocity, as a record compensation process. Further, the laser driving pulse is output to the laser driver 13.

The laser driver 13 performs a laser emission operation by supplying current to the laser diode in the optical pickup 1 on the basis of the laser driving pulse that has undergone the record compensation process. Accordingly, a mark according to the record data is formed on the optical disc 90.

Further, the laser driver 13 is equipped with a so-called an APC (Auto Power Control) circuit and controls the laser output to be constant without depending on temperature while monitoring laser output power by output of a detector for monitoring the laser power which is disposed in the optical pickup 1.

The object value of the laser output in recording or reproducing is provided from the system controller 10 and the laser output level is controlled to be the object value in recording and reproducing.

The optical block servo circuit 11 performs a servo operation by generating various servo drive signals for focusing, tracking, and sledding from a focus error signal and a tracking error signal from the matrix circuit 4.

That the optical block servo circuit 11 drives a focus coil and a tracking coil of the biaxial mechanism in the pickup 1, using the biaxial driver 18, by generating a focus drive signal and a tracking drive signal in accordance with the focus error signal and the tracking error signal. Therefore, a tracking servo loop and a focus servo loop is formed by the pickup 1, the matrix circuit 4, the optical block servo circuit 11, the biaxial driver 18, and the biaxial mechanism.

Further, the optical block servo circuit 11 performs a track jump operation by outputting a jump drive signal, by turning off the tracking servo loop in accordance with a track jump instruction from the system controller 10.

Further, the optical block servo circuit 11 drives the sled mechanism 3 with he sled driver 19, by generating a sled error signal that is obtained as the low-band component of the tracking error signal, or generating a sled drive signal on the basis of an access execution control from the system controller 10. The sled mechanism 3 is equipped with a mechanism composed of a main shaft holding the pickup 1, a sled motor, and a transmission gear, and drives the sled motor in accordance with a sled drive signal, thereby performing necessary movement of the pickup 1.

The sled servo circuit 12 performs control of CLV-rotating the spindle motor 2.

The spindle servo circuit 12 generates a spindle error signal by obtaining a clock, which is generated by the PLL process for the wobble signal, as the present rotation speed information of the spindle motor 2 and comparing the rotation speed information with predetermined CLV reference speed information.

Further, in reproducing of data, since a reproduction clock generated by the PLL in the data signal processing circuit 5 is the current rotation speed information of the spindle motor 2, it may be possible to generate the spindle error signal by comparing the reproduction clock with the predetermined CLV reference speed information.

Further, the spindle servo circuit 12 performs CLV rotation of the spindle motor 2, using the spindle driver 17, by outputting the spindle drive signal generated in accordance with the spindle error signal.

Further, the spindle servo circuit 12 also performs starting, stopping, accelerating, and decelerating of the spindle motor 2 by generating a spindle drive signal in accordance with a spindle kick/break control signal from the system controller 10.

Further, the spindle motor 2 is equipped with, for example, an FG (Frequency Generator) or a PG (Pulse Generator) and the output are supplied to the system controller 10. Therefore, the system controller 10 can recognize the rotational information (rotation speed and rotation angle position) of the spindle motor 2.

Various operations in the servo system and the record reproduction system described above are controlled by the system controller 10 that is implemented by a microcomputer.

The system controller 10 performs various processes in accordance with commands provided from the host device 200 through the host interface 8.

For example, when a write command is output from the host device 200, the system controller 10 first moves the pickup 1 to the address to be written. Further, as described above, an encoding process is performed on the data (for example, video data or audio data) transmitted from the host device 200 by the encoding/decoding unit 7. Further, the laser driver 13 is driven to emit a laser in accordance with the data encoded as described above, such that recording is performed.

Further, for example, when a read command that requests transmission of the data recorded on the optical disc is supplied, the system controller 10 controls a seek operation first for the instructed address. That is, the system controller 10 performs an access operation of the pickup 1, with the address designated by the seek command as a target, by giving a command to the optical block servo circuit 11.

Thereafter, the system controller 10 performs operation control for transmitting the data in the instructed data section to the host device 200. That is, the system controller 10 transmits requested data by reading out the data from the disc 90 and performing a reproduction process in the data detection processing unit 5 and the encoding/decoding unit 7.

Further, in the example of FIG. 1, although a disc drive device that is connected to the host device 200 is described, the disc drive device may be implemented in a type that is not connected to another device. In this case, an operation unit or a display unit is disposed, or the configuration of the data input/output interface becomes different from that in FIG. 1. That is, it may be preferable that a terminal portion for inputting/outputting a variety of data is formed while recording or reproducing is performed in accordance with a user's operation. Obviously, the configuration of the disk drive device may be implemented in various ways, other than the example.

2. Data Detection Processing Unit of First Embodiment

Figure 2:
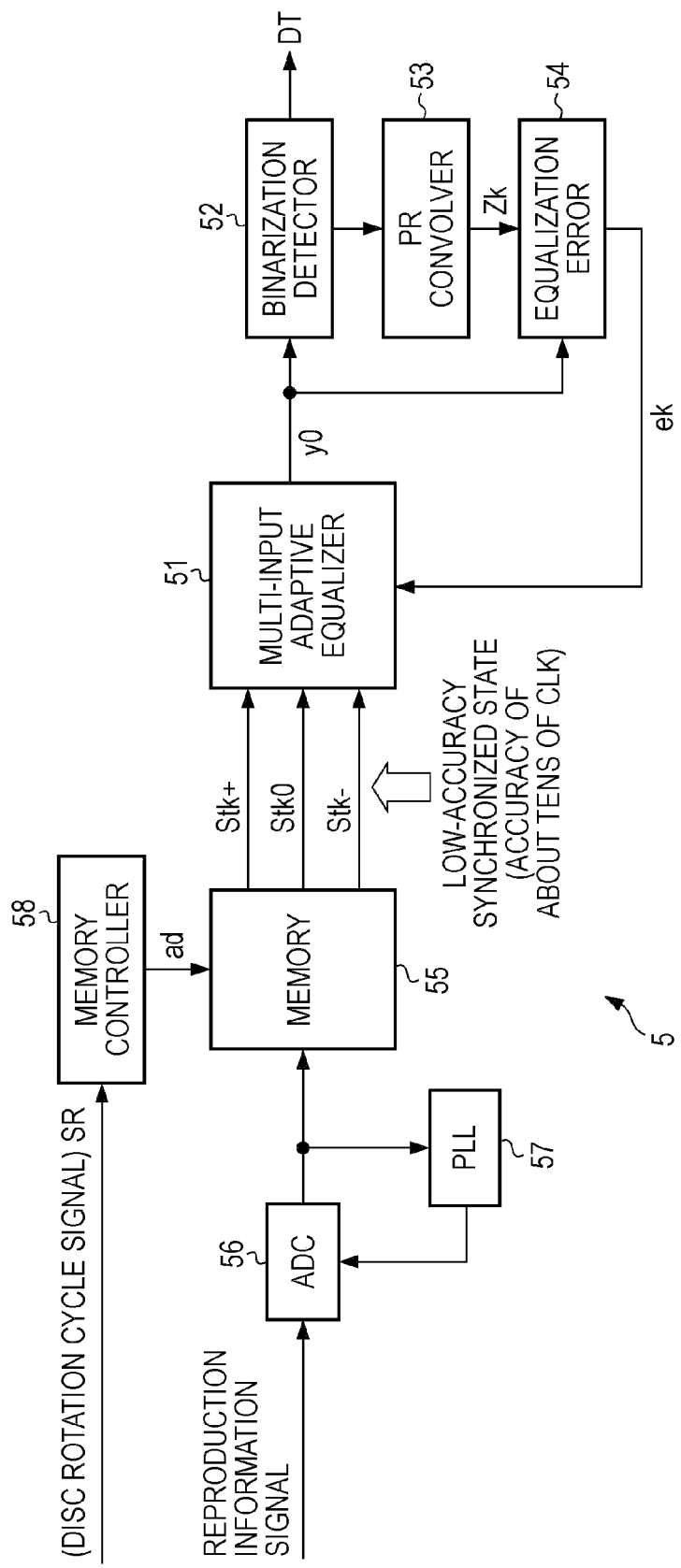
FIG. 2 is a block diagram of a data detection processing unit according to a first embodiment.

The configuration of the data detection processing unit 5, as a first embodiment, is shown in FIG. 2.

As described above, the data detection processing unit 5 performs a binarizing process of the reproduction information signal supplied from the matrix circuit 4.

As shown in FIG. 2, the data detection processing unit 5 includes a multi-input adaptive equalizer 51, a binarization detector 52, a PR convoler 53, an equalization error calculator 54, a memory 55, an A/D converter 56, a PLL circuit 57, and a memory controller 58.

The reproduction information signal supplied from the matrix circuit 4 is converted into digital data by the A/D converter 56.

The reproduction information signal that is converted into the digital data by the A/D converter 56 is supplied to the PLL circuit 57, and a reproduction clock is generated by the PLL process. The reproduction clock is used as a sampling clock of the A/D converter 56, and though not shown, is used as a clock for processing of the circuits at the latter stages.

In the embodiment, the reproduction information signal output from the A/D converter 56 is stored in the memory 55.

The reproduction information signal stored in the memory 55 is read out on the basis of a reading-out address 'ad' from the memory controller 58 and supplied to the multi-input adaptive equalizer 51.

A disc turn synchronization signal SR is supplied to the memory controller 58. This is a signal supplied from the system controller 10, for example, on the basis of an FG pulse or a PG pulse of the spindle motor 2, and is a signal showing the turning angle (turning phase) or the disc 90.

As the memory controller 58 supplies the reading-out address 'ad' on the basis of the disc turn synchronization signal SR, a reproduction information signal read out from a target track that is the target of the binarization process and reproduction information signals from two close tracks adjacent to the target track are simultaneously read out from the memory 55 at each time point.

The two close tracks are the track positioned by one track inside from the target track and a track positioned by one track outside from the target track, in the disc. That is the reproduction information signal from the two close tracks is reproduction information signal that is a crosstalk component for the reproduction information signal of the present target track.

In FIG. 2, the reproduction information signal of the target track read out from the memory 55 is shown as a reproduction information signal Stk0 and the reproduction information signals from two adjacent tracks are shown as reproduction information signals Stk+ and Stk−. For example, the reproduction information signal Stk+ is the reproduction information signal for the track adjacent to the outer circumference and the reproduction information signal Stk− is a reproduction information signal for the track adjacent to the inner circumference.

Since the reproduction information signals Stk+ and Stk− are reproduction information signals that are the crosstalk components, the reproduction information signals are the reproduction information signals from the pit series (or mark series) of the tracks adjacent to both ends, when the laser from the optical pickup 1 is radiated to the pit series (or the mark series) of the target track.

In the example, since the reproduction information signals Stk+ and Stk− of both adjacent pit series are obtained simultaneously with when the reproduction information signal Stk0 of the pit series of the target track, which is the processing target, is binarized, the reproduction information signal from the A/D converter 56 is temporarily stored in the memory 55. Further, it is roughly synchronized to the turn phase of the disc 90 and then read out.

Reproduction scanning by a laser spot of the optical pickup 1 proceeds from the memory 55 to the track outside by one from the target track, and the three reproduction information signals Stk0, Stk+, and Stk− can be read out when the reproduction information signal of the outer track is stored in the memory 55. That is, when the reproduction information signal stored in that time point is the reproduction information signal Stk+, the reproduction information signal before one cycle may be read out as the reproduction information signal Stk0 of the target track and the reproduction information signal before two cycles may be read out as the reproduction information signal Stk−. The reading-out is controlled by the memory controller 58.

Further, since the reproduction information signals Stk+ and Stk− are the signals for canceling crosstalk for the reproduction information signal Stk0, primarily, it is important that high-accuracy synchronization of the turning phase (turning angle position) has taken. That is, it is important that the information is the information of the adjacent pit series which are substantially the crosstalk components. However, in the embodiment, as described below, since the crosstalk cancellation is performed by the processing of the multi-input adaptive equalizer 51, the reproduction information signals Stk+ and Stk− may be in a synchronized state, for example, which is tens of clocks lower in accuracy than the reproduction information signal Stk0.

The multi-input adaptive equalizer 51 performs a PR adaptive equalization process on the reproduction information signal Stk0. That is, the reproduction information signal Stk0 is synchronized to be close to a target PR waveform. Further, the multi-input adaptive equalizer 51 also performs the adaptive equalization process on the reproduction information signals Stk+ and Stk− at the same time. An equalization signal y0 is output by performing calculation on the equalization output.

The binarization detector 52 obtains binarized data DT by performing a maximum-likelihood decoding process on the equalization signal y0 that has been PR-equalized, for example, as a Viterbi decoder. The binarized data DT is supplied to the encoding/decoding unit 7 shown in FIG. 1 and undergoes a reproduction data demodulation process.

Further, the PR convoler 53 generates a target signal Zk by performing a convolution process of the binarized result. The target signal Zk is an ideal signal without a noise, because the binarization detection result is convolved.

The equalization error calculator 54 obtains the equalization signal y0 from the multi-input adaptive equalizer 51 and an equalization error 'ek' from the target signal Zk, and the equalization error 'ek' is supplied to the multi-input adaptive equalizer 51 for tap coefficient control.

FIG. 5 shows an example of the configuration of the equalization error calculator 54. The equalization error calculator 54 is equipped with a subtractor 90 and a coefficient multiplier 91. The subtractor 90 subtracts the target signal Zk from the equalization signal y0. The coefficient multiplier 91 multiplies the subtracted result by a predetermined coefficient, thereby generating the equalization error 'ek'.

Figure 3:
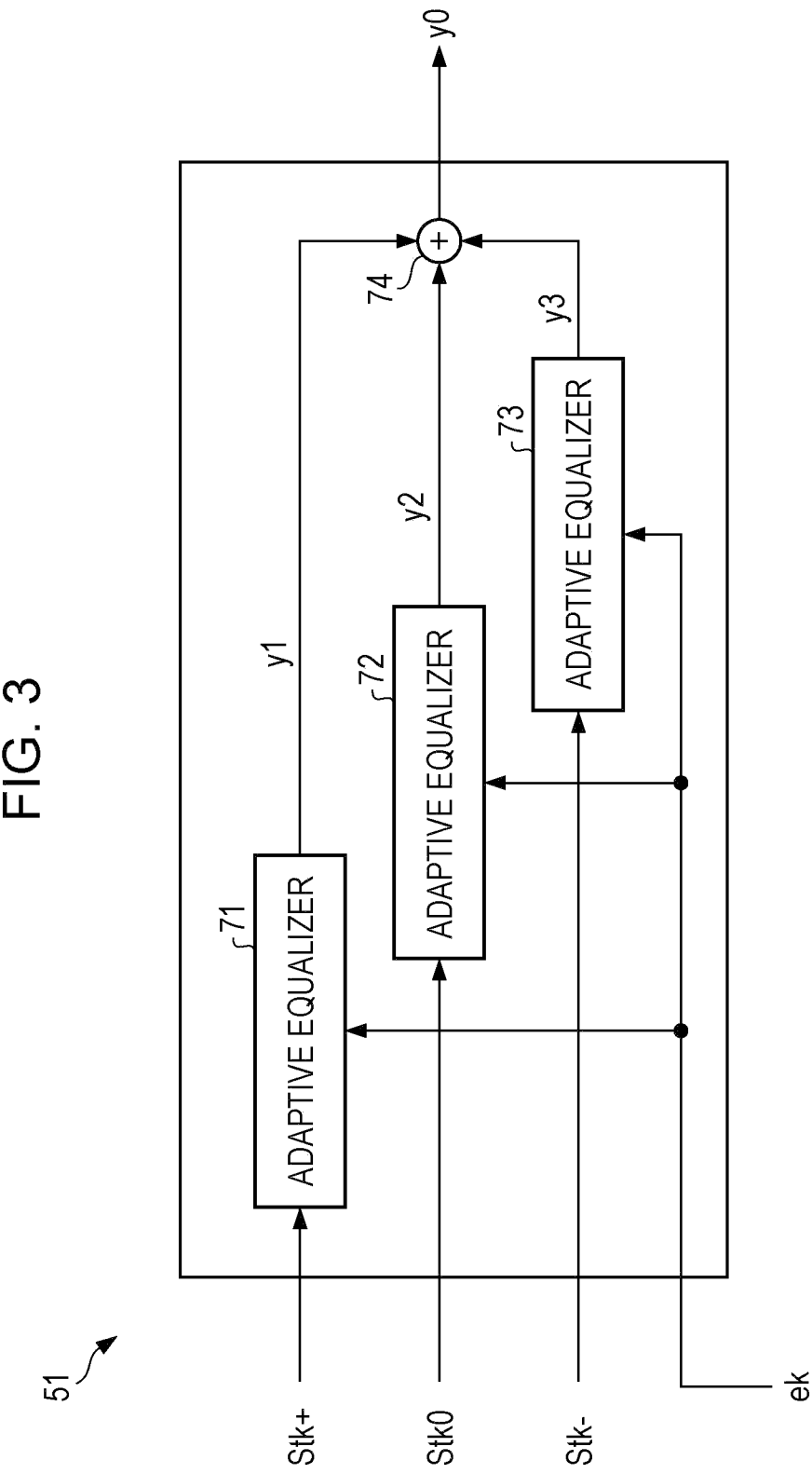
FIG. 3 is a block diagram of a multi-input adaptive equalizer according to an embodiment.

The configuration of the multi-input adaptive equalizer 51 unit is shown in FIG. 3.

The multi-input adaptive equalizer 51 includes adaptive equalizers 71, 72, and 73 and an accumulator 74.

The reproduction information signal Stk0 described above, the reproduction information signal Stk+, and the reproduction information signal Stk− are input to the adaptive equalizer 72, the adaptive equalizer 71, and the adaptive equalizer 73, respectively.

The adaptive equalizers 71, 72, and 73 have an FIR filter tap number, the calculation accuracy (divisible into bits), and a update gain parameter of the adaptive calculation, respectively, and the optimum values are set in the adaptive equalizers.

The equalization error 'ek' is supplied, as a coefficient control value for adaptive control, to the adaptive equalizers 71, 72, and 73.

Outputs y1, y2, and y3 of the adaptive equalizers 71, 72, and 73 are added by the accumulator 74 and outputs as the equalization signal y0 of the multi-input adaptive equalizer 51.

The output target of the multi-input adaptive equalizer 51 is the ideal PR waveform in which the binarization detection result is convolved to the PR (partial response).

Figure 4:
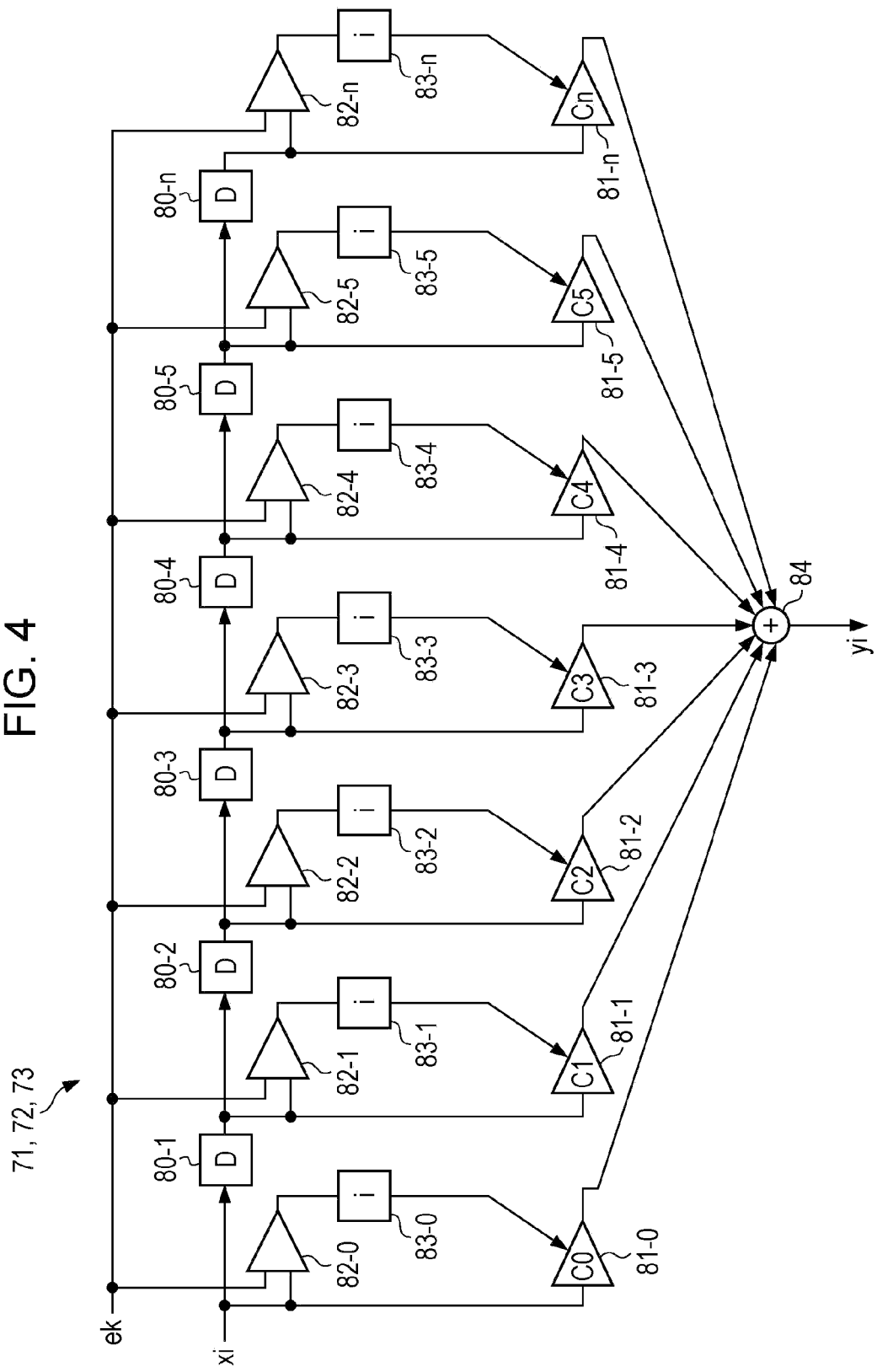
FIG. 4 is a block diagram of an adaptive equalizer according to an embodiment.

The adaptive equalizers 71, 72, and 73 are each implemented, for example, by the FIR filter shown in FIG. 4.

That is, the adaptive equalizers 71, 72, and 73 are each a filter having an n+1-stage tap, including delay elements 80-1 to 80-$n$, coefficient multipliers 81-0 to 81-$n$, and an accumulator 84.

The coefficient multipliers 81-0 to 81-$n$ multiply the input at each time point by tap coefficients C0 to Cn.

The outputs of the coefficient multipliers 81-0 to 81-$n$ are added and become the output y by the accumulator 84.

Control of the tap coefficients C0 to Cn is performed to perform an adaptive type equalization process. Accordingly, calculators 82-0 to 82-$n$ where the equalization error 'ek' and the tap inputs are input and calculated are disposed. Further, integrators 83-0 to 80-$n$ that integrate the outputs of the calculators 82-0 to 82-$n$ are disposed.

The calculators 82-0 to 82-$n$ performs calculation of, for example, $-1 \times ek \times x$. The outputs of the calculators 82-0 to 82$n$ are integrated by the integrators 83-0 to 80-$n$ and the tap coefficients C0 to Cn of the coefficient multipliers 81-0 to 81-$n$ are controlled to be changed by the integrated results. Further, the integration of the integrators 83-0 to 80-$n$ is for adjusting the response to the adaptive coefficient control.

In the data detection processing unit 5 having the configuration described above, the crosstalk cancellation is performed and then the decoding of the binarized data is performed.

The adaptive equalizers 71, 72, and 73 are supplied with the same equalization error 'ek' and perform adaptive equalization, with the configuration of FIG. 4.

First, the adaptive equalizer 72 where the reproduction information signal Stk0 of the process target track is input performs optimization on the input signal frequency component error and phase distortion of the reproduction information signal Stk0, that is, performs adaptive PR equalization. This is the same as the function of common adaptive equalizers. That is, adjustment of the tap coefficients C0 to Cn according to the calculation result of $-1 \times ek \times x$ in the calculators 82-0 to 82-$n$ implies that the tap coefficients C0 to Cn are adjusted such that the equalization error is removed.

Meanwhile, in the other adaptive equalizers 71 and 73, the output target is not connected with the reproduction information signals Stk+ and Stk− of the close tracks. Accordingly, the adaptive equalizers 71 and 73 perform calculation of deleting the connected components, that is, the crosstalk components.

That is, in the adaptive equalizers 71 and 73, the adjustment of the tap coefficients C0 to Cn according to the calculation result of $-1 \times ek \times x$ in the calculators 82-0 to 82-$n$ implies that the tap coefficients C0 to Cn are adjusted such that frequency characteristics that allows deletion of the crosstalk components from the addition result of the calculator 74 of FIG. 3 are obtained.

As described above, the tap coefficients C0 to Cn are adaptively controlled to obtain the target frequency characteristics by the equalization error 'ek' in the adaptive equalizer 72, while the tap coefficients C0 to Cn are automatically controlled to obtain the frequency characteristics for crosstalk cancellation by the same equalization error 'ek' in the adaptive equalizers 71 and 73. Therefore, the outputs y1, y2, and y3 of the adaptive equalizers 71, 72, and 73 are added and obtained by the accumulator 74 and the equalization signal y0 of the multi-input adaptive equalizer 51 is a signal with crosstalk canceled.

Further, in the adaptive equalizers 71, 72, and 73 shown in FIG. 4, in order to provide a function of adjusting the phase components, in addition to the amplitude components on the frequency axis, optimizing correction is performed on synchronization of the reproduction information signals Stk0, Stk+, and Stk−, which is not even roughly synchronized, in the multi-input adaptive equalizer 51. Therefore, it is not necessary to adjust the phase with one clock accuracy, which is primarily necessary for the reproduction information signals Stk0, Stk+, and Stk−. Accordingly, as described above, the reproduction information signals Stk0, Stk+, and Stk− may be read out with rough accuracy from the memory 55.

According to the embodiment, it is possible to remove a crosstalk component of an adjacent track from the reproduction information signal Stk0 with very high accuracy. Therefore, the reproduction performance can be considerably improved in high-accuracy recording or recording of an interposed track pitch, in which deterioration due to crosstalk from an adjacent track is serious.

FIG. 6A is the test result in radial tilt states ($-0.6°$, $0°$, $+0.6°$) with each layer of a Blu-ray disc recorded at a high density of 33.4 GB, which shows the effect of the embodiment.

The comparative example described herein implies a configuration without performing crosstalk cancellation. That is, the configuration is when the output of the A/D converter of FIG. 2 is directly PR-equalized by the adaptive equalizer and Viterbi-decoded by the binarization detector 52.

In the comparative example, bit error rates are $2.63 \times 10-4$, $4.51 \times 10-6$, $9.54 \times 10-4$ for radial tilts of $-0.6°$, $0°$, $+0.6°$.

On the other hand, in the embodiment, the bit error rates are $6.25 \times 10-6$, $3.13 \times 10-6$, $3.13 \times 10-6$ for radial tilts of $-0.6°$, $0°$, $+0.6°$.

FIG. 6B shows the values in a graph, in which the dotted line is the comparative example and the solid line is the embodiment.

When the disc is reproduced and the radial tilt is present, crosstalk from an adjacent track significantly increases and the reproduction performance is correspondingly deteriorated, the error rate considerably increases close to the practical limit even by using ECC (error correction) at the latter stages, in the result of reproduction signal process in the comparative example.

On the other hand, in the embodiment, even under a condition where a radial tilt is present, the error rate does not substantially increase and the reproduction performance largely increases in the increase in crosstalk.

The ratio (%) of FIG. 6A shows an effect of error reduction in the embodiment to the comparative example, and is a value obtained by dividing the error rate of the comparative example by the error rate of the embodiment. In the embodiment, the error rate is improved under a radial tilt.

Although a radial tilt is applied in the test, the same effect can be expected when narrowing the track pitch. Narrowing the track pitch is directly connected with expansion of the disc capacity per recording layer, such that it is possible to expect to considerable increase in the capacity of the record disc by the embodiment.

Figure 7A:
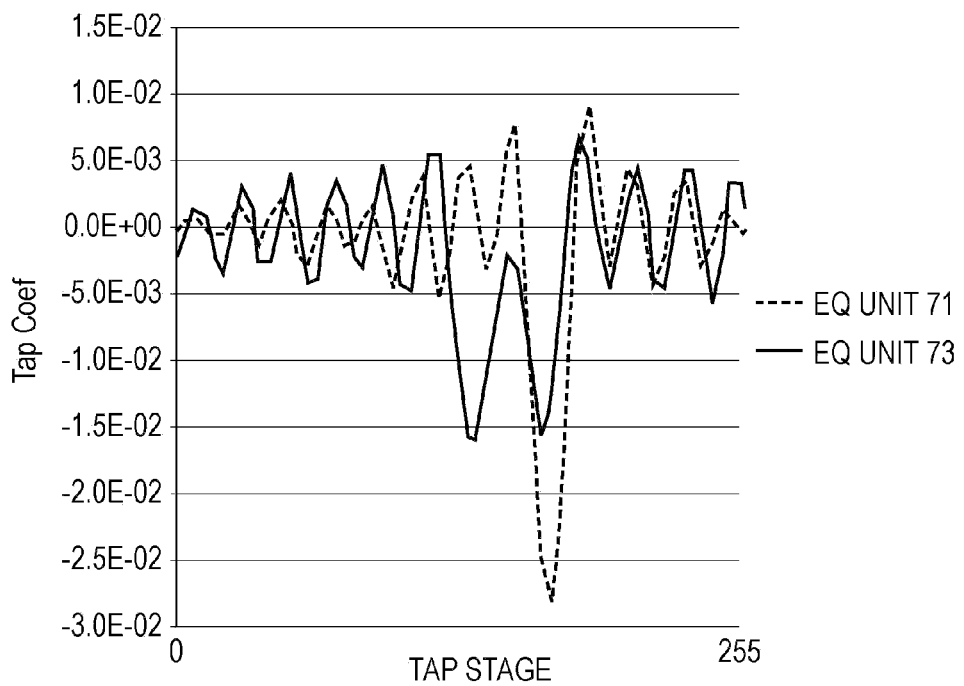
FIGS. 7A and 7B are illustrative diagrams of a tap coefficient of an adaptive equalizer according to an embodiment.
Figure 7B:
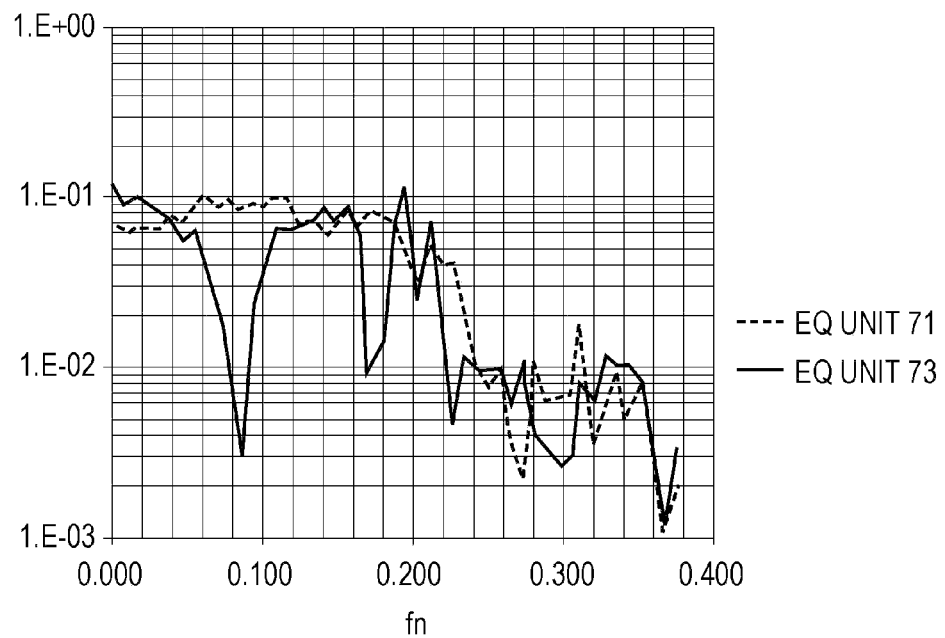

Further, the embodiment has an effect of optimizing phase distortion of the crosstalk component and the amplitude component on the frequent axis. FIGS. 7A and 7B show tap coefficients after controlling the adaptive equalizers 71 and 73 where the reproduction information signals Stk+ and Stk− of the adjacent tracks are input, of the multi-input adaptive equalizer 51, and frequency characteristics obtained from the coefficients, in the test.

In FIG. 7A, the horizontal axis shows a tap stage 0 to a tap stage 255 when the number of tap stages is 256 while the vertical axis shows the tap coefficients for the tap stages.

Further, in FIG. 7B, the horizontal axis is a regulation frequency fn that is regulated at a sampling frequency of 1 while the vertical axis is a gain.

In both of FIGS. 7A and 7B, the dotted line indicates the adaptive equalizer 71 and the solid line indicates the tap coefficient of the adaptive equalizer 73.

Since the radial tilt brings asymmetric aberration in the adjacent tracks, a frequent characteristic with unexpected phase distortion are shown in the crosstalk components.

As proving it, a coefficient having a large component at a slightly deviating position is shown to correct an asymmetric phase difference in the tap coefficient of FIG. 7A while the frequency characteristic does not show a flat characteristic, as in FIG. 7B, but show a very complicated aspect.

The complication of the frequency characteristic is considered as reflecting an optical filtering effect according to a side lobe component that is shown asymmetrically to the beam strength by comatic aberration of the beam spot due to a tilt.

Further, since this is changed in accordance with a change in a tilt angle due to warpage of the disc, in accordance with the turn of the disc, it is considered that a correction mechanism having an input signal adaptive function, as the embodiment, is necessarily used in order to obtain the optimum crosstalk cancellation effect.

In other word, it is possible to follow even a dynamic crosstalk component and implement a stable and high-performance function of removing crosstalk, which is difficult to be achieved in the related art, by appropriately setting the parameters of the adaptive equalizers 71, 72, and 73 in the embodiment.

As described above, in the embodiment, the reproduction information signal of an adjacent separate track is added as an equalizer input signal, for the adaptive equalizer of the reproduction information signal of a process target. Further, it is possible to improve reproduction performance by removing the crosstalk component from an adjacent track with high accuracy, even under various optical aberration and skew conditions, such as a disc tilt or focus deviation in reproduction, spherical aberration, and track offset in recording and reproducing, by using an automatic optimizing function of the frequency characteristic (amplitude and phase) of the adaptive equalizer.

Further, in the embodiment, the reproduction information signals of a plurality of tracks are stored once in the memory 55 and the reproduction information signals Stk0, Stk+, and Stk− of a plurality of adjacent tracks are half-synchronized (an error of about several to tens of channel clock is permissible) and read out by a simple synchronizing method, such as a disc turn synchronization signal SR. Further, optimizing the difference in phase components and the frequency characteristic of the crosstalk component is performed by the function of the multi-input adaptive equalizer 51, and optimal crosstalk removal signals are generated, thereby improving the reproduction performance.

Accordingly, high-accuracy crosstalk cancellation is implemented without using a complicated synchronizing circuit, even in a device using a simple and easy reproduction pickup that can obtain the reproduction signal of only one track at one time.

3. Data Detection Processing Unit Of Second Embodiment

Figure 8:
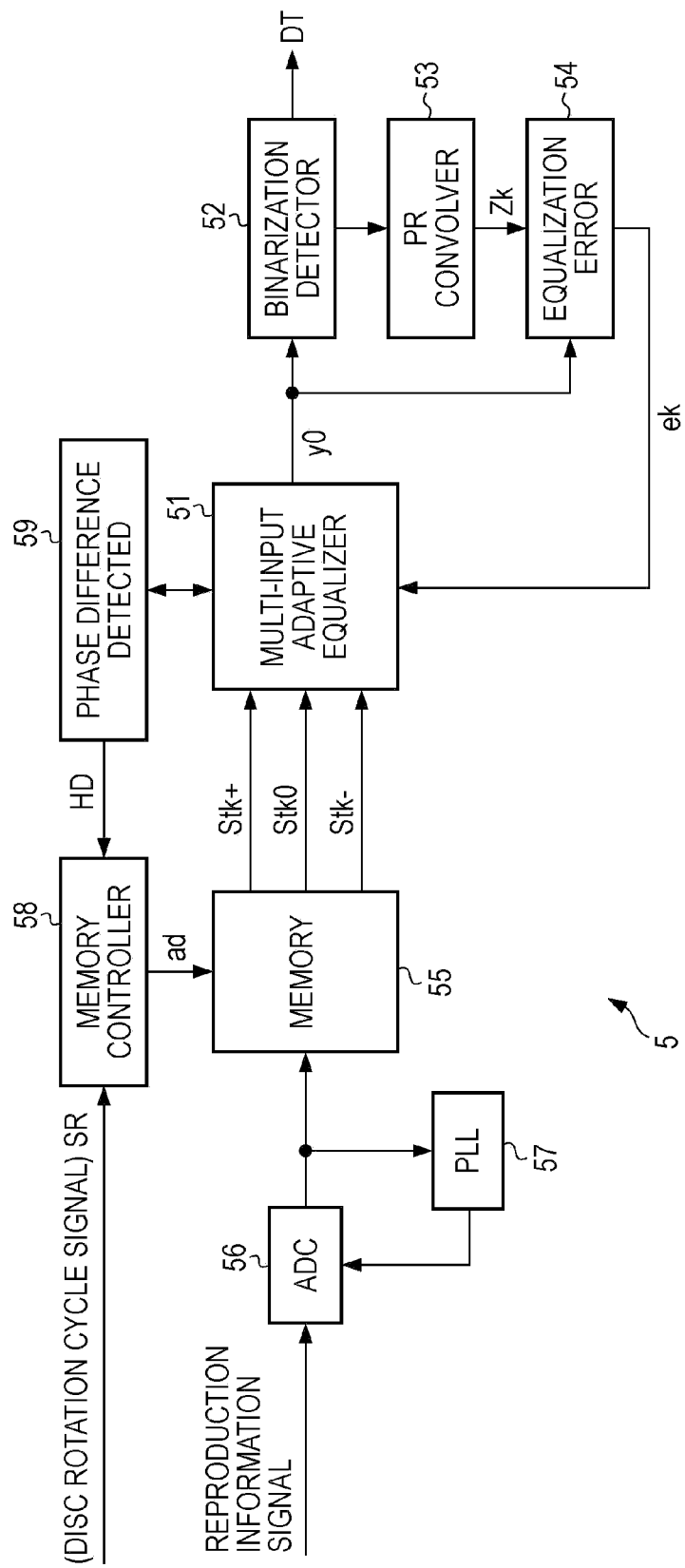
FIG. 8 is a block diagram of a data detection processing unit according to a second embodiment.

The configuration of the data detection processing unit 5 according to a second embodiment is shown in FIG. 8. Further, the same components as those in FIG. 2 are given the same reference numerals and the description is not provided.

The configuration of FIG. 8 is implemented by adding a phase detecting unit 59 to the configuration of FIG. 2.

The phase detecting unit 59 obtains a phase difference (time difference) between the reproduction information signal Stk0 of the target track and the reproduction information signals Stk+ and Stk− of adjacent tracks from control values of the tap coefficients of the adaptive equalizers 71, 72, and 73 of the multi-input adaptive equalizer 51. Further, a correction signal HD that decreases the phase difference is supplied to the memory controller 58.

The memory controller 58 adjusts the reading-out operation from the memory 55 in accordance with the correction signal HD. In detail, for example, the read-out addresses 'ad' are increased/decreased. Accordingly, the phase difference in the reproduction information signals Stk0, Stk+, and Stk− from the memory 55 is reduced.

Further, the phase detecting unit 59 also shifts the tap coefficients of the adaptive equalizers 71 and 73 and the integration values of the integrators 83-0 to 83-n, for the adjacent tracks by the phase correction operation.

Therefore, it is possible to reduce the number of taps of the adaptive equalizers 71, 72, and 73. Accordingly, it is possible to obtain an effect of simplifying the configuration of the equalizer and reducing the mounting area. This is because calculation of the crosstalk cancellation can be achieved within a range of less taps of equalizers, by correspondingly performing phase adjustment of the reproduction information signals Stk0, Stk+, and Stk−, even if the phases dynamically change.

Further, it is possible to induce a more stable crosstalk cancellation performance under the condition of the constant number of taps.

4. Data Detection Processing of Third Embodiment

Figure 9:
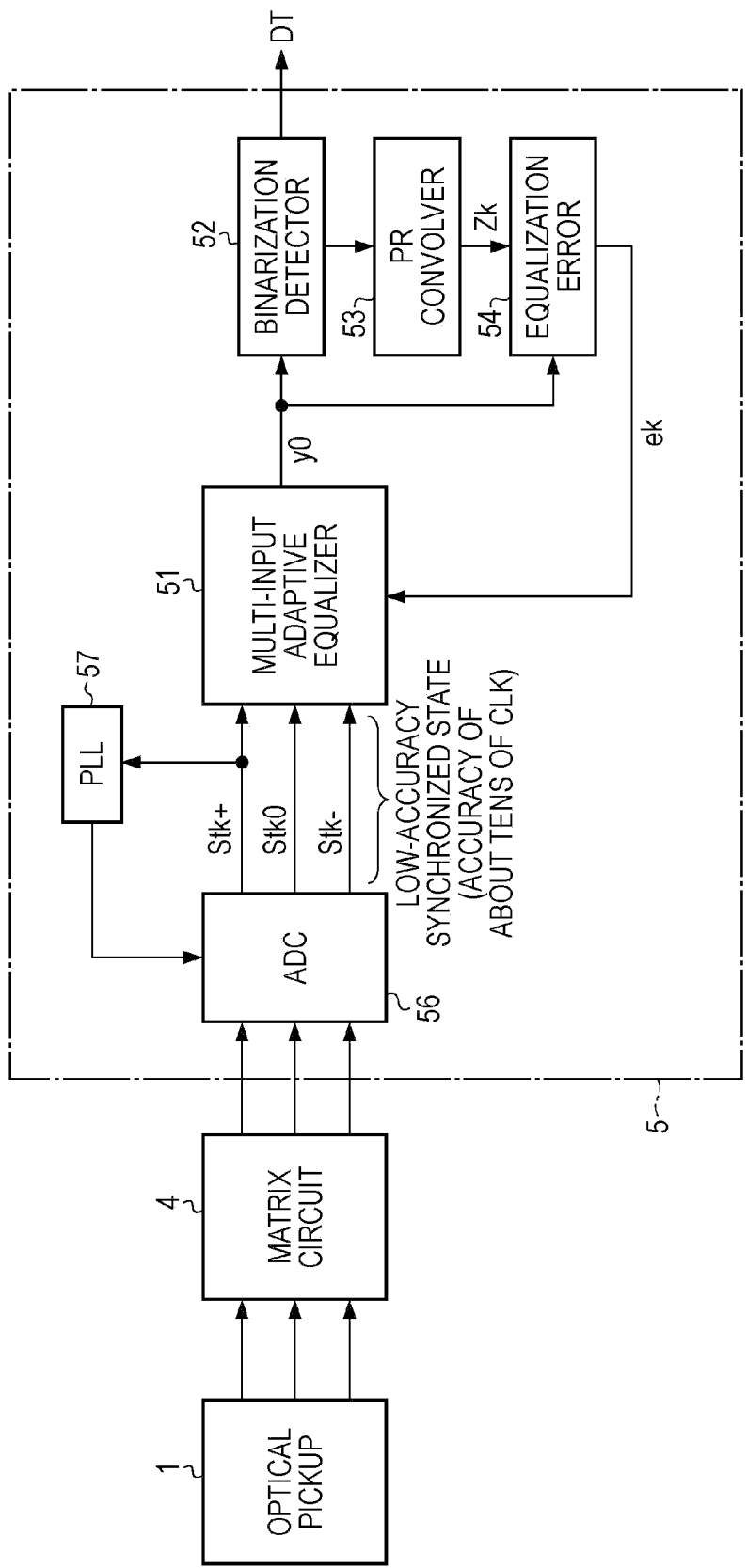
FIG. 9 is a block diagram of a data detection processing unit according to a third embodiment.

The configuration of the data detection processing unit 5 according to a third embodiment is shown in FIG. 9. Further, the same components as those in FIG. 2 are given the same reference numerals and the description is not provided.

The configuration of FIG. 9 is obtained by removing the memory 55 and the memory controller 58 from the configuration of FIG. 2.

In this case, for example, the optical pickup 1 scans the tracks at both sides of the target track with both side spots when scanning the track to process with the main spot by radiating three spot lasers. Further, the reflected light by radiating the three laser spots is detected by three systems of photodetectors, such that it is possible to simultaneously obtain reproduction information signals of the target track and the adjacent tracks at both sides.

In this configuration, the reproduction information signals may be converted into digital data by the A/D converter 56 and supplied to the multi-input adaptive equalizer 51, as the reproduction information signals Stk0, Stk+, and Stk−.

The crosstalk cancellation operation is the same as that in the first embodiment.

When the optical pickup 1 and the matrix circuit 4 are implemented to independently read out the reproduction information signals of three tracks, the data detection processing unit 5 can perform a binarization process having a crosstalk cancellation function with the configuration as shown in FIG. 9, such that the configuration of the data detection processing unit 5 can be simplified.

5. Modified Example

Although embodiments are described above, various modified embodiments may be considered from the present disclosure.

For example, although the reproduction information signals of two tracks adjacent to the inner circumference and the outer circumference of the target track are input, as the reproduction information signals of the adjacent tracks, to the multi-input adaptive equalizer 51, the reproduction information signals of four tracks may be input to the multi-input adaptive equalizer 51.

That is, two tracks close to the outer circumference of the target track and two tracks close to the inner circumference are the adjacent tracks, respectively. Further, it may be possible that the multi-input adaptive equalizer 51 is provided with five adaptive equalizers and the reproduction information signal of the target track and the reproduction information signals of four close tracks is input to the adaptive equalizers, respectively.

For example, when the track pitch is narrowed, the reproduction information signals of an adjacent track and the next track may be the crosstalk components of the target track. In this system, it is appropriate to perform the crosstalk cancellation operation, corresponding to four close tracks.

On the contrary, the close track may be only one track that is adjacent to the outer circumference or the inner circumference of the target track. In this case, the multi-input adaptive equalizer 51 may be provided with two adaptive equalizers.

Similarly, the adjacent tracks may be three tracks, six tracks or more. In any case, the reproduction information signals of tracks, which are the crosstalk components, may be input to the multi-input adaptive equalizer 51 together with the reproduction information signals of the target track, in accordance with the characteristic or operation of a reproducing device or a recording medium.

Further, although a disk drive device for an optical disc is exemplified in the embodiments, the present disclosure can be applied to reproducing devices and data detecting devices for an optical recording medium, a disc type or other type of magnetic recording medium, other than the disc. That is, the present disclosure is useful when tracks are formed in parallel and crosstalk from an adjacent track is generated, in a recording medium.

What is claimed is:

1. A data detecting device comprising:
a multi-input adaptive equalizer comprising a plurality of adaptive equalizers, wherein the multi-input adaptive equalizer outputs an equalization signal by calculating outputs of the plurality of adaptive equalizers and adding the calculated outputs of the plurality of adaptive equalizers to one another, wherein a first reproduction information signal from a target track, which is data detection target, and a second reproduction information signal from a close track close to the target track, which is a crosstalk component for the reproduction information signal, are input to the plurality of adaptive equalizers, wherein the first reproduction information signal and the second reproduction information signal are simultaneously read out from a recording medium;
a binarizing unit that obtains binarized data by performing binarization of the equalization signal output from the multi-input adaptive equalizer;
a convolver that obtains an equalization target signal by performing convolution on the binarized data supplied to the convolver from the binarizing unit; and
an equalization error calculating unit that obtains an equalization error from the equalization signal output from the multi-input adaptive equalizer and the equalization target signal obtained by the equalization error calculating unit from the convolver, and supplies the equalization error to control adaptive equalization of the multi-input adaptive equalizer.

2. The data detecting device according to claim 1, further comprising:
a memory unit that stores the first reproduction information signal and the second reproduction signal read out from the recording medium,
wherein the first reproduction information signal and the second reproduction information signal track are simultaneously read out from the memory unit and supplied to the plurality of adaptive equalizers.

3. The data detecting device according to claim 2, further comprising:
a phase difference detecting unit that
detects a phase difference between the first reproduction information signal and the second reproduction information signal read out from the memory unit, wherein the first reproduction information signal and the second reproduction information signal read out from the memory unit are input to the plurality of adaptive equalizers without any timing adjustment,
inputs the detected phase difference to the plurality of adaptive equalizers, and
outputs a correction signal for correcting reading timing of the first reproduction information signal and the second reproduction information signal from the memory unit on the basis of the detected phase difference.

4. The data detecting device according to claim 1,
wherein the multi-input adaptive equalizer comprises three adaptive equalizers to receive the first reproduction information signal from the target track, the second reproduction information signal from a first close track adjacent to one side of the target track, and the second reproduction information signal from a second close track adjacent to the other side of the target track.

5. The data detecting device according to claim 1,
wherein the multi-input adaptive equalizer performs a partial response equalization process on the first reproduction information signal from the target track,
wherein the binarizing unit performs the binarization of the equalization signal by performing a maximum-likelihood decoding on the equalization signal.

6. A reproducing device comprising:
a head unit that reads out reproduction information signals from a recording medium;
a multi-input adaptive equalizer that comprises a plurality of adaptive equalizers, wherein the multi-input adaptive equalizer outputs an equalization signal by calculating outputs of the plurality of adaptive equalizers and adding the calculated outputs of the plurality of adaptive equalizers to one another,
wherein the multi-input adaptive equalizer receives the reproduction information signals comprising a first reproduction signal and a second reproduction signal which are simultaneously read out from the recording medium, wherein the first reproduction information signal is obtained from a target track which is data detection target, wherein the second reproduction information signal is obtained from a close track close to the target track which is a crosstalk component for the first reproduction information signal, wherein the reproduction information signals are input to the plurality of adaptive equalizers without any timing adjustment;
a binarizing unit that obtains binarized data by performing a binarization process on the equalization signal output from the multi-input adaptive equalizer;
a convolver that obtains an equalization target signal by performing convolution on the binarized data supplied to the convolver from the binarizing unit;
an equalization error calculating unit that obtains an equalization error from the equalization signal output from the multi-input adaptive equalizer and the equalization target signal obtained by the equalization error calculating unit from the convolver performing convolution on the binarized data obtained from the binarizing unit, and supplies the equalization error to control adaptive equalization of the multi-input adaptive equalizer; and a demodulating unit that demodulates reproduction data from the binarized data obtained by the binarizing unit.

7. A data detecting method, comprising:
inputting reproduction information signals comprising a first reproduction signal and a second reproduction signal to a multi-input adaptive equalizer, wherein the first reproduction information signal is obtained from a target track which is data detection target, wherein the second reproduction information signal is obtained from a close track close to the target track which is a crosstalk component for the first reproduction information signal, wherein the reproduction information signals are input to a plurality of adaptive equalizers of the multi-input adaptive equalizer without timing adjustment;
performing a binarization process on an equalization signal output from the multi-input adaptive equalizer to obtain binarized data;
performing convolution directly on the binarized data obtained by the binarizing process to obtain an equalization target signal;
obtaining an equalization error from the equalization signal output from the multi-input adaptive equalizer and the equalization target signal; and
performing tap coefficient control for adaptive equalization of the multi-input adaptive equalizer, using the equalization error.

8. The data detecting device according to claim 1, wherein the adaptive equalization of the multi-input adaptive equalizer is controlled by controlling tap coefficients of each of the plurality of adaptive equalizers.

9. The data detecting device according to claim 1, wherein each of the plurality of adaptive equalizers comprises:
a calculator that performs a calculation based on the equalization error and a tap input; and
an integrator that integrates output of the calculator to control tap coefficients of an adaptive equalizer.

10. The data detecting device according to claim 1, wherein tap coefficients of a first adaptive equalizer of the plurality of adaptive equalizers are adaptively controlled based on the equalization error to obtain target frequency characteristics, wherein the first reproduction information signal from the target track is input to the first adaptive equalizer.

11. The data detecting device according to claim 1, wherein tap coefficients of a first adaptive equalizer and a second adaptive equalizer of the plurality of adaptive equalizers are automatically controlled based on the equalization error to obtain frequency characteristics for crosstalk cancellation, wherein the second reproduction information signal from each of close tracks adjacent to each side of the target track is input to each of the first adaptive equalizer and the second adaptive equalizer.

* * * * *